United States Patent [19]

Eriksson et al.

[11] 4,265,430
[45] May 5, 1981

[54] DEVICE FOR MARKING AND/OR CUTTING PIPES

[76] Inventors: Bengt O. Eriksson, P.B. 7951, 860 20 Njurunda; Bror E. Pahnke, Sibirienvägen 17, 852 53 Sundsvall, both of Sweden

[21] Appl. No.: 851,763

[22] Filed: Nov. 15, 1977

[30] Foreign Application Priority Data

Nov. 24, 1976 [SE] Sweden ............................... 7613164

[51] Int. Cl.³ ............................................. B23K 7/04
[52] U.S. Cl. .................................... 266/54; 33/21 C; 266/57
[58] Field of Search ............... 33/21 C; 266/54, 56, 266/57

[56] References Cited

U.S. PATENT DOCUMENTS

| 2,384,128 | 9/1945 | Nation | 266/57 |
| 2,652,243 | 9/1953 | Reed | 266/57 |
| 2,734,737 | 2/1956 | Scardina | 266/57 |
| 2,866,631 | 12/1958 | Cink | 266/56 |
| 3,451,666 | 6/1969 | Evans | 266/54 |
| 3,936,714 | 2/1976 | Marshall et al. | 266/60 X |
| 4,053,145 | 10/1977 | Steele | 266/54 X |

*Primary Examiner*—Paul A. Bell
*Attorney, Agent, or Firm*—Birch, Stewart, Kolasch & Birch

[57] ABSTRACT

The present invention is directed to a device for marking and/or cutting a pipe. The device includes a fixture for clamping one of the pipe fittings in a desired position relative to an axis passing through the pivot center of a projecting boom to which an effecting element is afixed in such a way to follow the outside of the wall of the pipe fitting at a present distance from the axis, preferably matching the radius of the other pipe fitting, as the projecting boom pivots about its pivot center.

13 Claims, 2 Drawing Figures

DEVICE FOR MARKING AND/OR CUTTING PIPES

BACKGROUND OF THE INVENTION

1. Field of the Invention

The present invention relates to a device for the marking and/or cutting of a pipe. For example, when a branch pipe is connected to a main pipe. More particularly, the present invention is directed to a device for marking and/or cutting one or both of the two pipes or pipe fittings to be joined, of which one at least is of circular cross section.

2. Description of the Prior Art

Traditional trade methods are still in common use when positioning branch pipes on mains. Hence, even in the simple case where a branch pipe is to be joined symmetrically and at right angles to a main, a large expenditure of labor is still required. The end of the branch pipe to be joined on is marked manually, "by eye", and then cut along the mark to obtain an approximate fit between the end and the outer surface of the wall of the main at the connection point. A number of further trials are then generally necessary, with repeated marking and grinding down of the branch pipe. When an adequate, though usually not quite exact, fit is achieved, the main can also be marked and then cut.

The marking and cutting procedure described above is even more complicated and time-consuming when a branch pipe has to be positioned at an oblique angle to a main, and perhaps also off-set from the plane of symmetry of the main.

SUMMARY OF THE INVENTION

The main objective of the invention is to make available a simple, easily operated device by which the necessary marking can be executed with great precision and in a considerably shorter time than is taken by the above described traditional trade method. The device according to the present invention is further to be designed so that it can be fitted with a cutting accessory, in the form of a cutting torch of similar device, so as to be capable of executing the required cut without prior marking.

According to the present invention, the device fulfilling the requirements discussed above, is characterized primarily by a fixture for clamping one of the pipe fittings in the desired position relative to an axis passing through the pivot center of a projecting boom to which an effecting element is affixed in such a way as to follow the outside of the wall of the pipe fitting at a preset distance from the said axis, preferably matching the radius of the other pipe fitting, as the projecting boom pivots about its pivot center.

Further scope of applicability of the present invention will become apparent from the detailed description given hereinafter. However, it should be understood, that the detailed description and specific examples, while indicating preferred embodiments of the invention, are given by was of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

As appears from the drawings, the essential components of the new device are made up of a fixture 10, in which a pipe fitting 12 is clamped to be marked or cut, and a frame 14, in which an effecting mechanism 16 is free to move up and down in guides.

Figure 1:
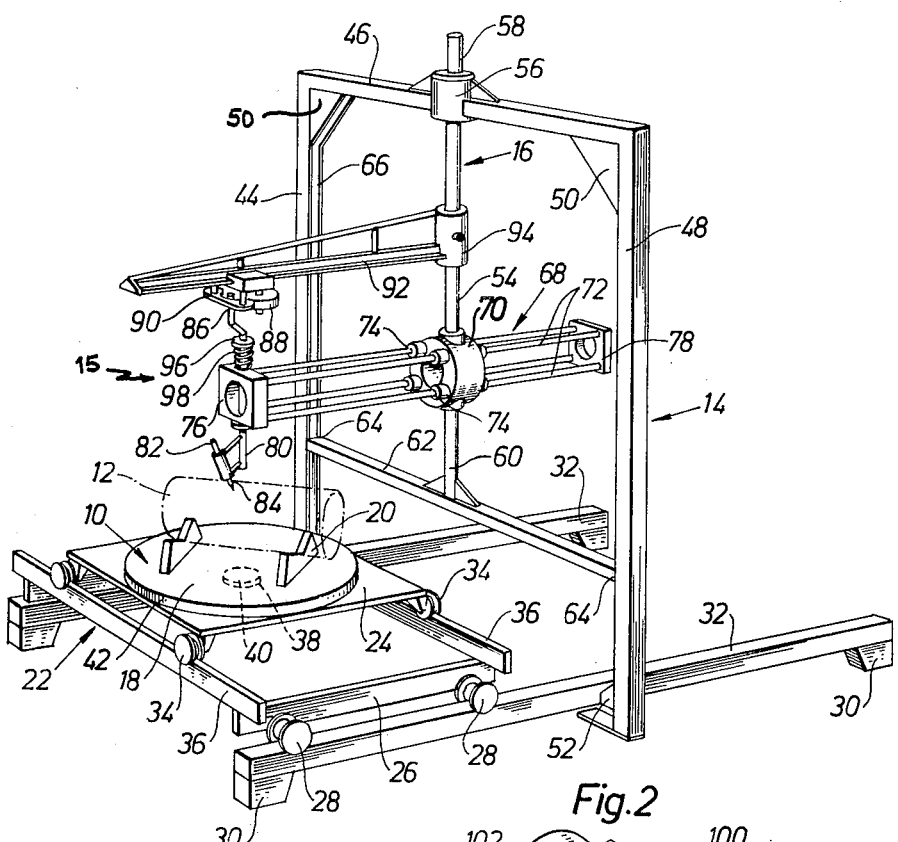
FIG. 1 is a perspective drawing of a device constructed in accordance with the invention for the marking or cutting of pipes.

As illustrated in FIG. 1, the fixture 10 comprises a revolving disc 18 provided with two supports 20 for the said pipe fitting 12, which is held in place by a suitable clamping means of a conventional type, not illustrated in detail. The disc 18 pivots on a base consisting of a rail-mounted carriage 22. In the case illustrated, the carriage 22 comprises an upper part 24 and a lower part 26. The lower part 26 of the carriage 22 is equipped on two mutually opposite sides with uniform wheels 28, which are free to rotate in engagement with matching rails 32, providing with feet 30 and serving to guide the carriage 22 in its motion towards and away from the effecting mechanism 16. The upper part 24 of the carriage 22 is also fitted with similar free wheels 34 running on matching rails 36, which in this case are mounted on the lower part 26 of the carriage 22 and at right angles to the previously mentioned rails 32. The purpose of this arrangement is to enable the pipe fitting 12, destined to be marked or cut, to be positioned in exactly the plane desired in relation to the fixed effecting mechanism 16. The revolving disc 18 is detachably mounted on the upper part 24 of the carriage 22, which part 24 is provided with a hole 38 intended for a matching center pin 40 in the disc 18. The disc 18 may further be provided around its outer circumference with a calibration 42 in degrees, whereby the disc 18 together with the pipe fitting 12 clamped thereon, can be rotated to the desired angle. In order to achieve the desired orientation of the pipe fitting 12 in three dimensions in relation to the effecting mechanism 16, means should also be provided parallel to the axis of the pipe fitting 12 for raising and lowering one end of the disc 18. Although not illustrated in the drawing, such a mechanism might consist, for example, of a conventional, hydraulically powered device.

In the embodiment illustrated, the frame 14 is constructed of U-irons 44, 46, 48, and has the form of an inverted U standing on a supporting base. The frame 14 thus comprises two side-pieces 44, 48 and a crosspiece 46 positioned above them. Corner brackets 50, 52 are fitted at the angles formed by the U-irons 44, 46, 48, and at the base ends of the sidepieces 44, 48, respectively. A piston element 54, associated with the effecting mechanism 16, is mounted to slide in a bushing 56 positioned at the midpoint of the upper crosspiece 46. Thus, the top end 58 of the piston element 54 projects up through the bushing 56, and the lower part 60 of the element 54 is located between the sidepieces 44, 48 of the frame 14 and is fixed to a crosspiece 62, the ends 64 of which are guided in the U-channels 66 of the two sidepieces 44, 48. This design enables the vertical motion of the piston element 54 to be dependably controlled.

A projecting boom 68, located between the side-pieces 44, 48 and on the piston element 54, is mounted to pivot in a bearing unit 70. The boom 68 consists of four uniform parallel tierods 72 passing through matching holes 74 in the bearing unit 70 and with their ends attached to the respective corners of matching square blocks 76, 78. The purpose of this arrangement is to constitute a projecting boom 68, which makes it possible to set exactly the distance between the axis of the piston element 54 and the vertical center line of the block 76. It is at this distance—which will usually be set to exactly match the radius of the larger-bore pipe fitting (not illustrated)—that the smaller-bore pipe fitting is to be clamped. An operating means 15 is connected to the boom 68 and includes a block 76, and coinciding with and passing through the center line of the block, is a mounting pin 80, upon which a detachable effecting element 82, e.g. a marking tool or cutting torch, may be mounted. The illustration shows a marking tool, which is positioned to form a certain angle with the mounting pin 80 passing through the square block 76. The object of this oblique position of the marking tool 82 is to make good-quality marking possible over the entire outer surface of the wall of the pipe fitting 12. As the projecting boom 68 pivots about the piston unit 54, the point 84 of the marking tool 82 will follow the outside of the wall of the pipe fitting 12, and at the same time the effecting mechanism 16, and with it the point 84 of the marking tool, will rise and fall with the level of the pipe wall. That part of the mounting pin 80 that is above the square block 76 has the form of a crank, and its end acts as a follower element 86, which because of a pivoted contact bearing is caused to press against a suitably shaped cam element 90. The purpose of this design is to impart a swiveling motion to the mounting pin 80 when the marking tool 84, in its passage over the wall of the pipe fitting 12, reaches the highest point of the wall. Inasmuch as the mounting pin 80 is then caused to swivel round, the angle of contact of the marking tool 84 is also modified, with the result that effective and uniform marking is achieved on both sides of the vertical plane of symmetry of the pipe fitting. The cam element 90 and the bearing element 88 are arranged to slide and be clamped on an arm 92, which, like the projecting boom 68, is fixed to and projects from the piston element 54. The distance between the bearing unit 88 and the piston unit 54 is set according to the distance between the mounting pin 80 and the said piston unit 54. Naturally, the swiveling motion of the projecting boom 68 is not accompanied by any swiveling motion of the arm 92, but the latter is clamped to the piston unit 54 by means of a locking nut 94. Between the top of the square block 76 and a washer 96 fixed permanently on the mounting pin 80 is a helical spring 98. The purpose of this spring 98 is to impart sufficient torsional inertia to the mounting pin 80 to prevent any unintended swiveling motion thereof.

Figure 2:
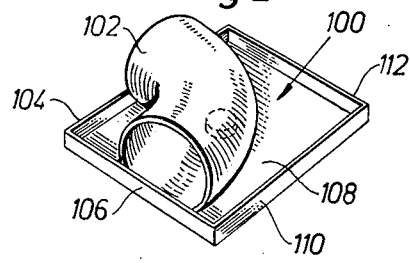
FIG. 2 is a perspective drawing of an accessory to the device illustrated in FIG. 1.

It is convenient in some cases to replace the revolving disc 18 of FIG. 1, fitted with supports 20, with an open-topped box 100 of the type illustrated in FIG. 2. The box is mounted on the upper part 24 of the carriage 22, in the same manner as the revolving disc 18, and can also be calibrated in degrees (calibration not shown) to enable it to be rotated to the desired angle. The box 100 has been proven especially suitable e.g. for the clamping of a pipe bend 102, the ends of the fitting being brought to bear on two adjacent sides 104, 106 of the box 100, while the body of the fitting rests with part of its outer wall surface in contact with the bottom 108 of the box 100. Advantageous clamping is obtained by fitting spacing elements (not illustrated) in an appropriate manner between the pipe bend 102 and the two remaining sides 110, 112 of the box 100.

The device illustrated in the drawings is specially designed for the marking of a pipe fitting that is to serve as a branch off a main of larger bore. As already mentioned, however, the marking tool 82 used for this purpose may be replaced with a cutting torch (not illustrated), in cases where this is appropriate, which means that the marking operation can be entirely omitted, and the cut be made immediately along the desired jointing lines.

It is also possible within the terms of the invention to achieve the marking and/or cutting of a larger-bore pipe, forming part of the main to which a smaller-bore fitting is to be joined. To execute this marking and/or cutting, however, the device illustrated in the drawing must be modified somewhat. Thus, the projecting arm must in the latter case be capable of pivoting through 360°, while the cam unit must be disengaged from the end of the mounting pin. In this case there is no crosspiece 62, and the guides for the piston unit may then be attached e.g. directly to the floor and ceiling of the workshop. The larger-bore pipe is centered in the desired position below the piston unit, the projecting boom is set to the desired radius, which may match the radius of the smaller-bore branch pipe, whereafter the projecting boom is caused to pivot around as the larger-bore pipe is marked or cut.

When marking and cutting the smaller-bore pipe, the process is preferably divided into two operations, each operation consisting of the marking or cutting of one half of the pipe fitting, which is rotated in the fixture through 180° between the two operations.

It is evident from the above that the drawing illustrates only one special embodiment of the invention and that modifications can be made without departing from the concept of the invention. The effecting mechanism may be counterbalanced for manual operation, but naturally motor power may also be used. Various types of drive may also be utilized for the rail-mounted carriage and for swiveling the projecting boom.

What is claimed is:

1. A device for marking or cutting a pipe to have a straight, curved or conical shape, along a predetermined line which corresponds to a line at which a branch pipe is subsequently connected to a main pipe comprising:
    a boom being pivotally mounted on an axis passing through the pivot center of said boom;
    a fixture means for holding said branch pipe stationary at a desired position relative to said axis during operation of said device;
    an operating means connected to said boom and swingable therewith for marking or cutting said branch pipe, said boom being adjustable relative to said axis to position said operating means at a predetermined distance from said axis corresponding to the radius of said main pipe;
    a mounting unit for said boom including a piston unit being coaxial with and corresponding to said axis, said piston unit being mounted within a frame to permit axial movement of said piston unit in a direction perpendicular to said boom and in conformity with the movement of said operating means across the outside surface of said pipe; said operating means being positioned at an angle to a mounting element that projects at right angles from the boom; and said fixture means including a detachable revolvable disc being provided with supports for said branch pipe and being pivoted at its center to permit rotation to a desired angle.

2. A device according to claim 1, wherein the fixture means is set up on a rail-mounted carriage for the purpose of bringing the fixture into the desired position in relation to the effecting means.

3. A device according to claim 1, and further including a raising and lower means being provided to impart the fixture means the desired inclination with respect to a fixed base.

4. A device according to claim 1, wherein the mounting component consists of a mounting pin passing through a hole in the projecting boom, a portion of the pin opposite an effecting element having the form of a crank, and its end being arranged for operation by a cam element in such a way that the pin of the mounting element is caused to swivel through 180° at that point in the motion of the effecting element where the latter ceases to move away from the fixture and begins to move towards the fixture.

5. A device according to claim 1, wherein the branch pipe is cut by said operating means.

6. A device for marking or cutting a pipe according to claim 1, wherein said frame member includes at least two upwardly projecting sidepieces each being fixed at a lower end thereof to one of a pair of carriage rails and each being fixed at an upper end thereof to an upper crosspiece, said piston unit including an upwardly projecting rod and a substantially horizontal crosspiece, said upwardly projecting rod being slidably received in said upper crosspiece and said substantially horizontal crosspiece being slidably mounted with respect to said upwardly projecting sidepieces.

7. A device for marking or cutting a pipe according to claim 6, wherein said upwardly projecting sidepieces are U-shaped channels in which end portions of said substantially horizontal crosspiece are slidably received.

8. A device for marking or cutting a pipe according to claim 6, wherein said rod is slidably mounted within a bushing mounted on said upper crosspiece.

9. A device for marking or cutting a pipe according to claim 6, wherein said carriage rails extend outwardly from each side of said upwardly projecting sidepieces in a direction orthogonal thereto, said fixture means being mounted on a carriage having an upper member and a lower member, said lower member of said fixture means including wheels in operative engagement with said carriage rails.

10. A device for marking or cutting a pipe according to claim 9, wherein said lower member of said fixture means includes matching rails disposed mutually perpendicular to said carriage rails and said upper member of said fixture means including wheels in operative engagement with said matching rails.

11. A device for marking or cutting a pipe according to claim 1, wherein said boom includes at least one tie rod being adjustably received within a bearing unit, said bearing unit being mounted on said piston unit.

12. A device for marking or cutting a pipe according to claim 11, wherein said boom includes four tie rods adjustably received within said bearing unit.

13. A device for marking or cutting a pipe to have a straight, curved or conical shape, along a predetermined line which corresponds to a line at which a branch pipe is subsequently connected to a main pipe comprising:

a boom being pivotally mounted on an axis passing through the pivot center of said boom;

a fixture means for holding said branch pipe stationary at a desired position relative to said axis during operation of said device;

an operating means connected to said boom and swingable therewith for marking or cutting said branch pipe, said boom being adjustable relative to said axis to position said operating means at a predetermined distance from said axis corresponding to the radius of said main pipe;

a mounting unit for said boom including a piston unit being coaxial with and corresponding to said axis, said piston unit being mounted within a frame to permit axial movement of said piston unit in a direction perpendicular to said boom and in conformity with the movement of said operating means across the outside surface of said pipe; said operating means being positioned at an angle to a mounting element that projects at right angles from the boom; and said fixture means includng a detachable box, open at the side facing the boom, making it possible to clamp a branch pipe bend or similar component, and pivoted at its center to permit rotation to a desired angle.

* * * * *